(12) United States Patent
Ito et al.

(10) Patent No.: US 7,899,851 B2
(45) Date of Patent: Mar. 1, 2011

(54) INDEXING METHOD OF DATABASE MANAGEMENT SYSTEM

(75) Inventors: Daisuke Ito, Kokubunji (JP); Kazutomo Ushijima, Kokubunji (JP); Akira Shimizu, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/574,398

(22) Filed: Oct. 6, 2009

(65) Prior Publication Data
US 2010/0023480 A1 Jan. 28, 2010

Related U.S. Application Data

(63) Continuation of application No. 11/483,548, filed on Jul. 11, 2006, now Pat. No. 7,617,265.

(30) Foreign Application Priority Data

Jul. 12, 2005 (JP) ................. 2005-202401

(51) Int. Cl.
*G06F 17/30* (2006.01)
(52) U.S. Cl. ......... 707/828; 707/829; 707/955; 707/956; 707/968; 711/111; 711/152; 711/163
(58) Field of Classification Search ................. 707/828, 707/829, 952, 955, 968; 711/111, 152, 163, 711/170, 202
See application file for complete search history.

(56) References Cited

U.S. PATENT DOCUMENTS

| | | | |
|---|---|---|---|
| 5,247,660 A | 9/1993 | Ashcraft et al. | |
| 5,515,531 A | 5/1996 | Fujiwara et al. | |
| 5,551,027 A | 8/1996 | Choy et al. | |
| 5,717,911 A | 2/1998 | Madrid et al. | |
| 5,862,059 A | 1/1999 | Matula et al. | |
| 5,960,194 A | 9/1999 | Choy et al. | |
| 6,073,129 A | 6/2000 | Levine et al. | |
| 6,105,033 A | 8/2000 | Levine | |
| 6,298,344 B1 | 10/2001 | Inaba et al. | |
| 6,438,562 B1 | 8/2002 | Gupta et al. | |
| 6,977,927 B1 * | 12/2005 | Bates et al. | 370/381 |
| 7,047,250 B1 | 5/2006 | Agarwal et al. | |
| 7,133,870 B1 | 11/2006 | Tripp et al. | |
| 7,277,892 B2 * | 10/2007 | Yanase et al. | 1/1 |
| 2005/0154731 A1 | 7/2005 | Ito et al. | |
| 2008/0177975 A1 * | 7/2008 | Kawamura | 711/173 |

FOREIGN PATENT DOCUMENTS

JP 2005-196602 7/2005

* cited by examiner

*Primary Examiner* — Jean M Corrielus
(74) *Attorney, Agent, or Firm* — Mattingly & Malur, P.C.

(57) ABSTRACT

A database management system has a plurality of database servers and data can be transferred between them by partitioning a data area into small areas and altering allocation of the small areas to the database servers. After altering the configuration, there occurs degradation in processing speed that accompanies re-creation of the index. If this problem is solved by using conventional techniques, noticeable degradation in processing speed will occur to a specific query at the time of a steady state operation. Accordingly, an index created for each of the small areas and an index to all of the small areas are allocated to the database server and used in combination.

8 Claims, 8 Drawing Sheets

INDEXING METHOD OF DATABASE MANAGEMENT SYSTEM

This application is a continuation application of U.S. Ser. No. 11/483,548, filed Jul. 11, 2006, the entirety of which is incorporated herein by reference.

CLAIM OF PRIORITY

The present application claims priority from Japanese application JP 2005-202401 filed in Jul. 12, 2005, the content of which is hereby incorporated by reference into this application.

FIELD OF THE INVENTION

This invention relates to an indexing method for operating a database management system (DBMS) whose data area was partition.

BACKGROUND OF THE INVENTION

The DBMS usually uses an index in order to speed up retrieval. Especially the B-Tree structure and its extended structure are data structures suitable for a disk unit, and therefore are widely used as the most common index structure. In the B-Tree structured index is obtained by sorting a specific one or plurality of columns in a table in advance. The index is arranged so that search efficiency is increased, whereby search with the column being used as a key is speeded up.

Meanwhile, as the amount of data has increased in recent years, attentions have been attracted to the cluster DBMS that uses a plurality of DB servers. As one method for operating the cluster DBMS, there is a method in which partition is performed with the hash-division algorithm or the range division method using a specific one or plurality of partition key columns in a table so that the same row in the table is not shared by the DB servers.

The cluster DBMS being operated by the above-mentioned method comes with a disadvantage that it will take a time to alter its configuration, such as a change of the number of DB servers. With the cluster DBMS, in the case of query processing that requires search results of all the DB servers to be summarized, query processing performance is governed by a DB server that takes the largest time. Since occurrence of a difference in the amount of data among the servers generally degrades the performance, it is essential to equalize the amount of data when altering the configuration. However, this processing requires data on a disk unit to be transferred to a physically different place, therefore taking a long time to do so.

U.S. Pat. No. 5,551,027 gives description about a hierarchical index for narrowing retrieval by a non-partition key in a cluster environment of the non-shared type DBMS. According to it, by using a global index consisting of a pair of a non-partition key and server number that maintains its column, it is possible to narrow down a server to be used for retrieval. However, the global index has only that capacity, but not a capacity for indicating a specific column in the table.

SUMMARY OF THE INVENTION

Figure 2A:
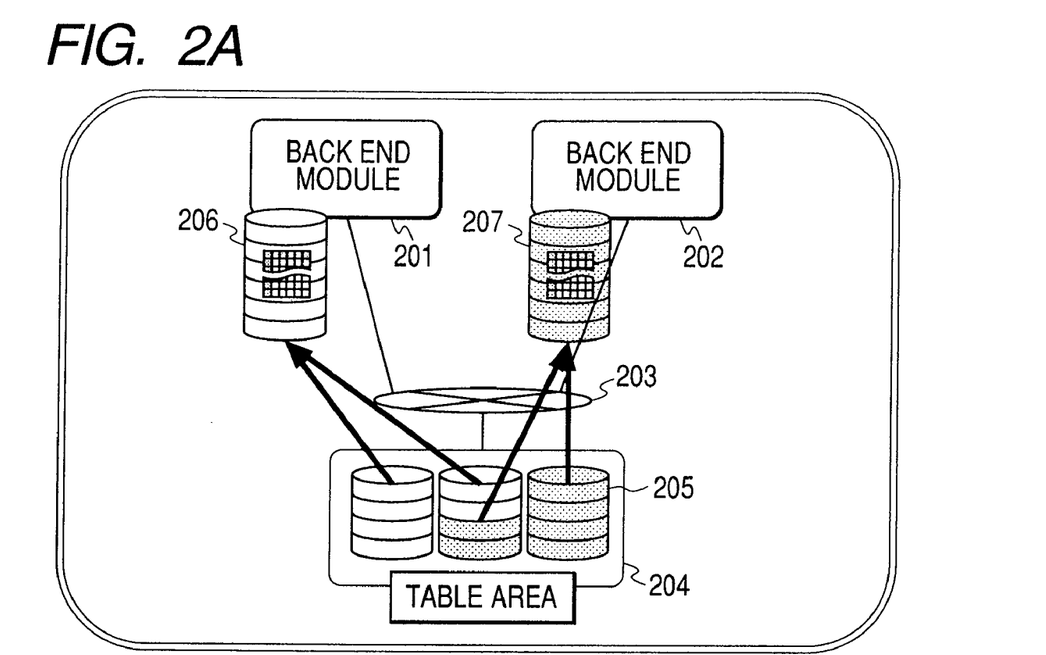
FIG. 2A shows a state before allocation alteration.
Figure 2B:
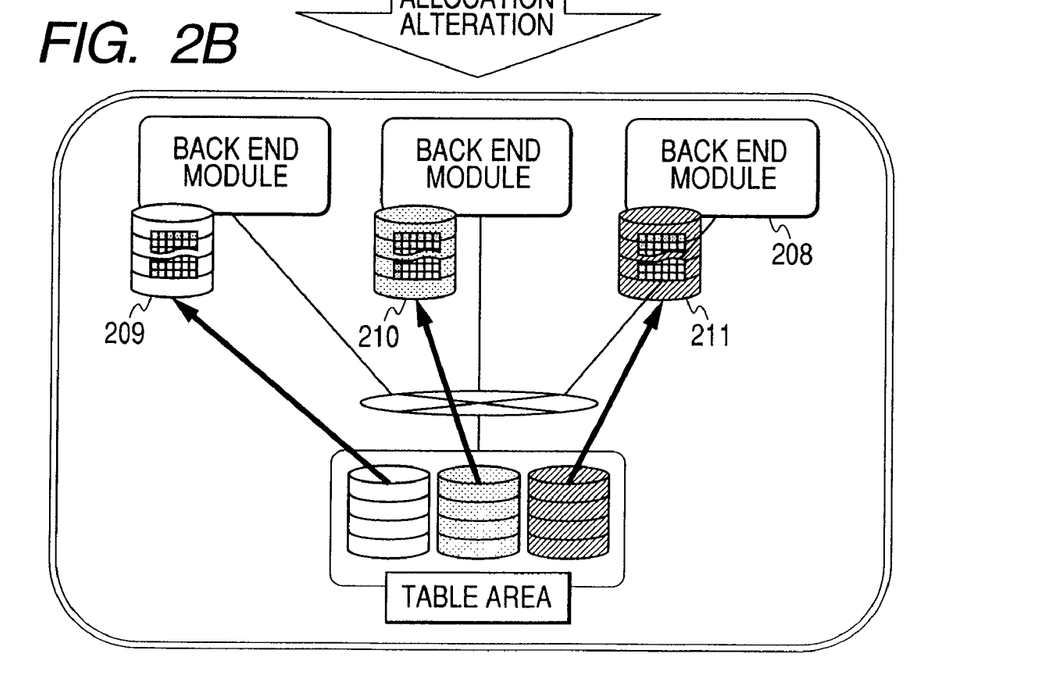
FIG. 2B shows a state after allocation alteration.

The inventors of this invention have previously proposed an invention in which a sharable storage is partitioned in advance and only allocation thereof is altered at the time of configuration alteration of the DBMS, whereby high-speed configuration alteration that does not accompany transfer of data is made feasible (JP 2004-003601 A). FIGS. 2A and 2B show examples in each of which a table area 204 is partitioned into 12 small areas 205. In a state shown by FIG. 2A, two set of six small areas 206, 207 allocated to two back end modules 201, 202 connected to each other via a network 203, respectively. FIG. 2B shows a state of FIG. 2A with one back end module 208 being newly added. In this state, three sets of four small areas 205 are allocated to three back end modules 209,210,211, respectively. The prior application proposes a method in which, as a method for partitioning a storage, a partition key column of a table is used and the same partitioning method as that of a table is used. Moreover, the allocation of the small areas 205 to the DB servers is managed using an allocation management table.

In addition, it is also possible to imitate a function of the method of the prior application only using partitioned storages, without using the allocation management table. As one example, the imitating is possible by creating a large number of small LU's each corresponding to a small area in the shared storage on a network and manually managing allocation of these LU's. However, in this case, it is necessary to secure all matters that the DBMS manages, such as consistency management of transaction, which makes the operation complicated.

However, in the case where JP 2004-003601 A and the imitated technique described above are applied to a DBMS equipped with an index search function, there arises a problem that the index needs to be re-created. This is a problem arising from the DBMS having a configuration that makes it possible to create an index by specifying a column different from a partition key column of the table as a key. Re-creation of the index generally requires the whole table to be scanned, which needs a considerable time. Because of this, in the case of presence of the index, a merit of the high-speed configuration alteration by JP 2004-003601 A and the imitated technique described above will become faded.

Figure 3A:
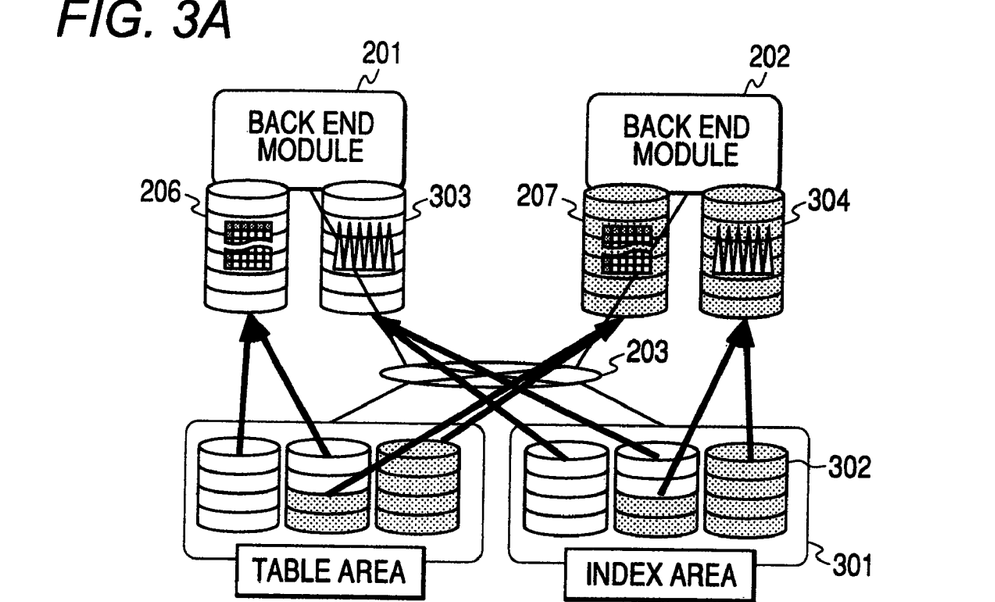
FIG. 3A shows a state before allocation alteration.
Figure 3B:
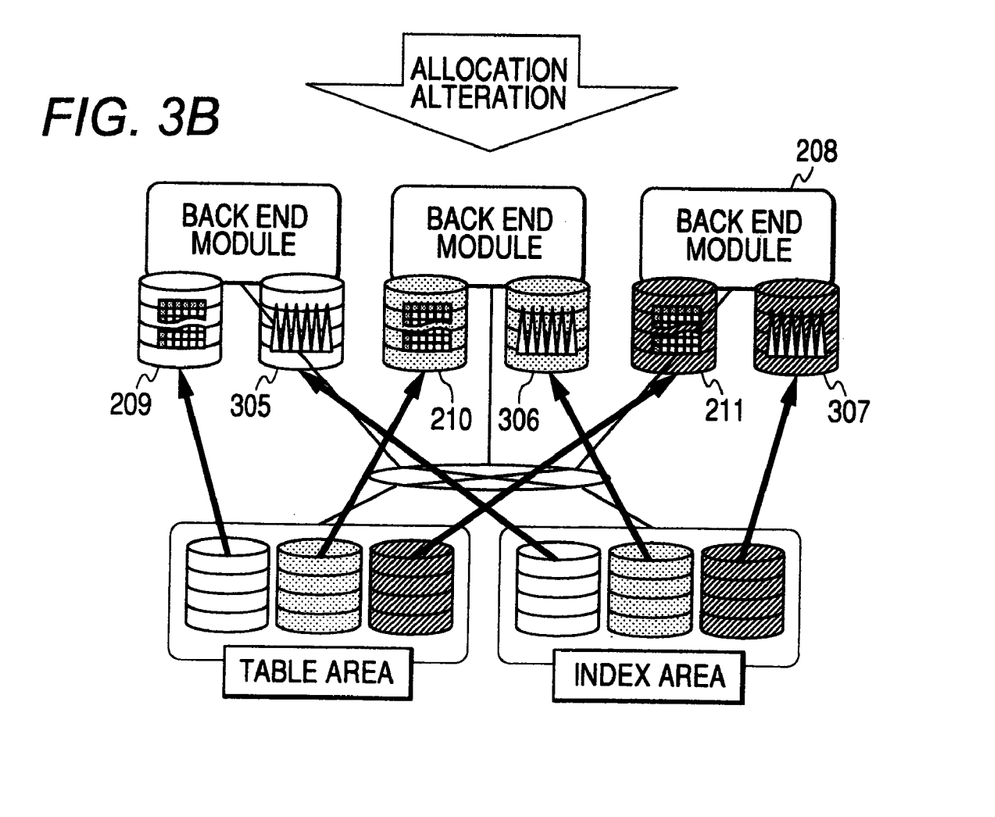
FIG. 3B shows a state after allocation alteration.
Figure 4:
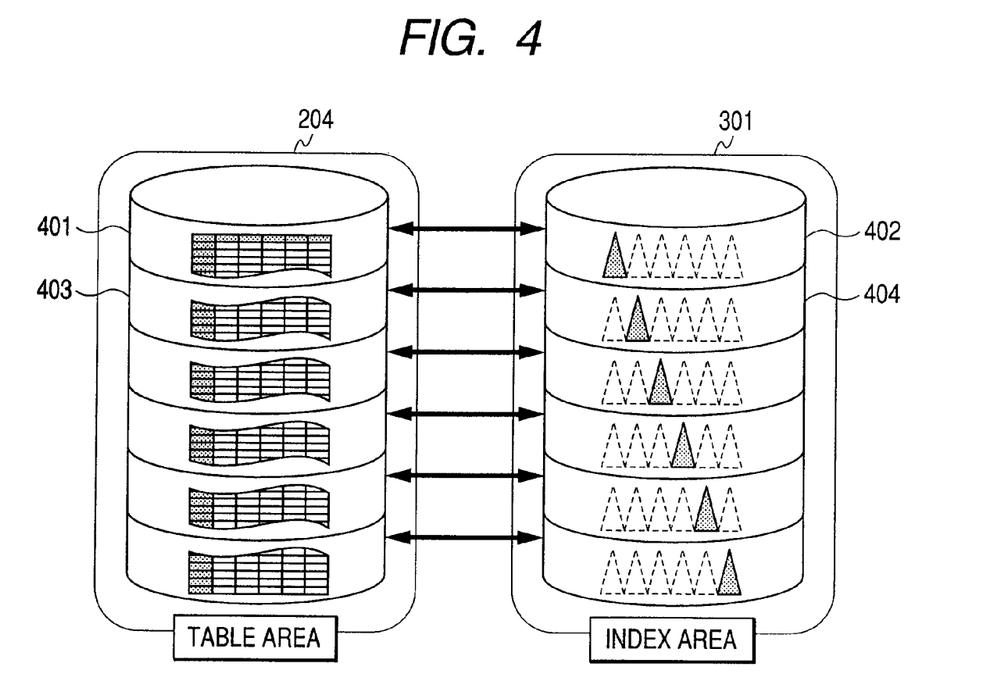
FIG. 4 is an explanatory diagram showing a method for configuring an index that makes it possible to alter the configuration with high speed in the database management system whose data area was partitioned.

There is also a case, as a solution method enabled by the conventional technique, where an index area 301 is previously partitioned (302) by the same dividing method as that of the table area 204 into the same number of partitioned areas, as shown in FIG. 3, and the technique proposed by the above-mentioned JP 2004-003601 A and the imitated technique described above are applied to the index area, and the partitioned areas and index areas 303, 304, 305, 306, 307 are allocated to the back end modules 201, 202, 208, whereby the high-speed configuration alteration can be realized including the index. Where the index area 301 is partitioned, it is necessary to establish one-to-one correspondence between small areas in the table area 204 and small areas in the index area 301. In this case, this correspondence includes a correspondence between small areas 401 in the table area 204 and small areas 402 in the index area 301 and a correspondence between small areas 403 in the table area 204 and small areas 404 in the index area 301. However, if this method is applied to the B-Tree index, a large number of small indices whose search cost is much the same as that of the usual index for the whole table area 204 will be created. As a result, a problem that a search cost will be multiplied by the number of partitions in the partition for a specific query, such as range retrieval.

Therefore, the problem that is intended to be solved by this invention is concerned with an operation of a database management system that consists of a plurality of database servers and enables the database servers to transfer data between them by partitioning a data area into small areas and altering allocation of the small areas to the database servers. More specifically, the problem is the occurrence of degradation in processing speed that accompanies the re-creation of the index after the configuration alteration. If this problem is intended to be solved by using the conventional technique, the problem is an occurrence of noticeable degradation in processing speed to a specific query at the time of a steady state operation.

In the operation of a database management system that consists of a plurality of database servers and enables the database servers to transfer data between them by partitioning a data area into small areas and altering allocation of the small areas to the database servers, indices created for the respective small areas and an index for all the small areas allocated to each database server are used in combination.

In the operation of a database management system that enables the database servers to transfer data between them by partitioning a data area into small areas and altering allocation of the small areas to the database servers, after the configuration alteration by altering allocation of the partitioned data areas, noticeable degradation in processing speed caused by re-creation of the index will not occur and, at the time of a steady state operation, noticeable degradation in processing speed to a specific query will not occur.

BRIEF DESCRIPTION OF THE DRAWINGS

FIGS. 2A and 2B are explanatory diagrams showing a method of altering the configuration with high speed in a database management system whose data area was partitioned.

FIGS. 3A and 3B are explanatory diagrams showing a method of high-speed configuration alteration in the database management system whose data area was partitioned.

DETAILED DESCRIPTION OF THE PREFERRED EMBODIMENT

Figure 1:
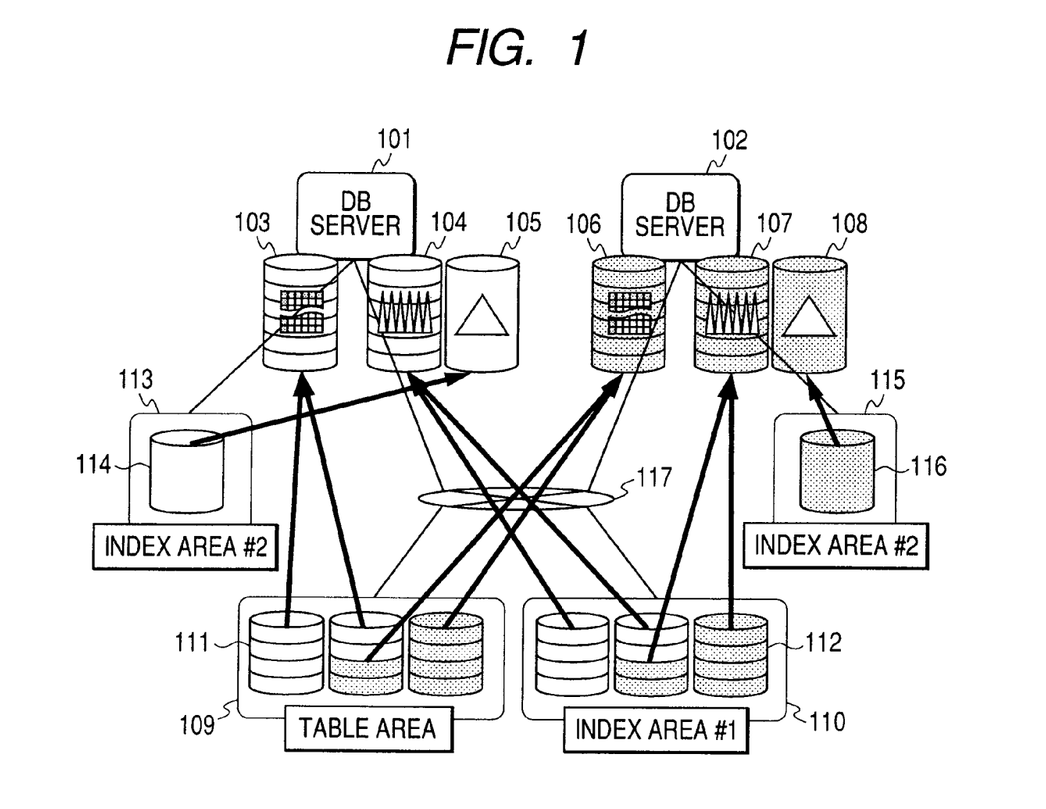
FIG. 1 is a conceptual diagram showing a system configuration of a database management system according to this invention.

FIG. 1 shows a best mode for carrying out the invention. In this embodiment, a plurality of DB servers 101, 102 are connected with a table area 109 and an index area #1 110 on a network-connected storage via a network 117, and accordingly the table area 109 and the index area 110 are sharable by the plurality of DB servers 101,102. Moreover, exclusive index areas #2 113,115 are connected with the respective DB server. The table area 109 and the index area #1 110 are partitioned internally into the same number of small areas 111, 112 by using the same technique. Each of the small areas 103,104,106,107 is allocated to the DB servers 101,102. Small areas are not created in the other index areas #2 113, 115, but one or a plurality of areas 114, 116 are made up and referred to by DB servers 105, 108.

First Embodiment

Figure 5:
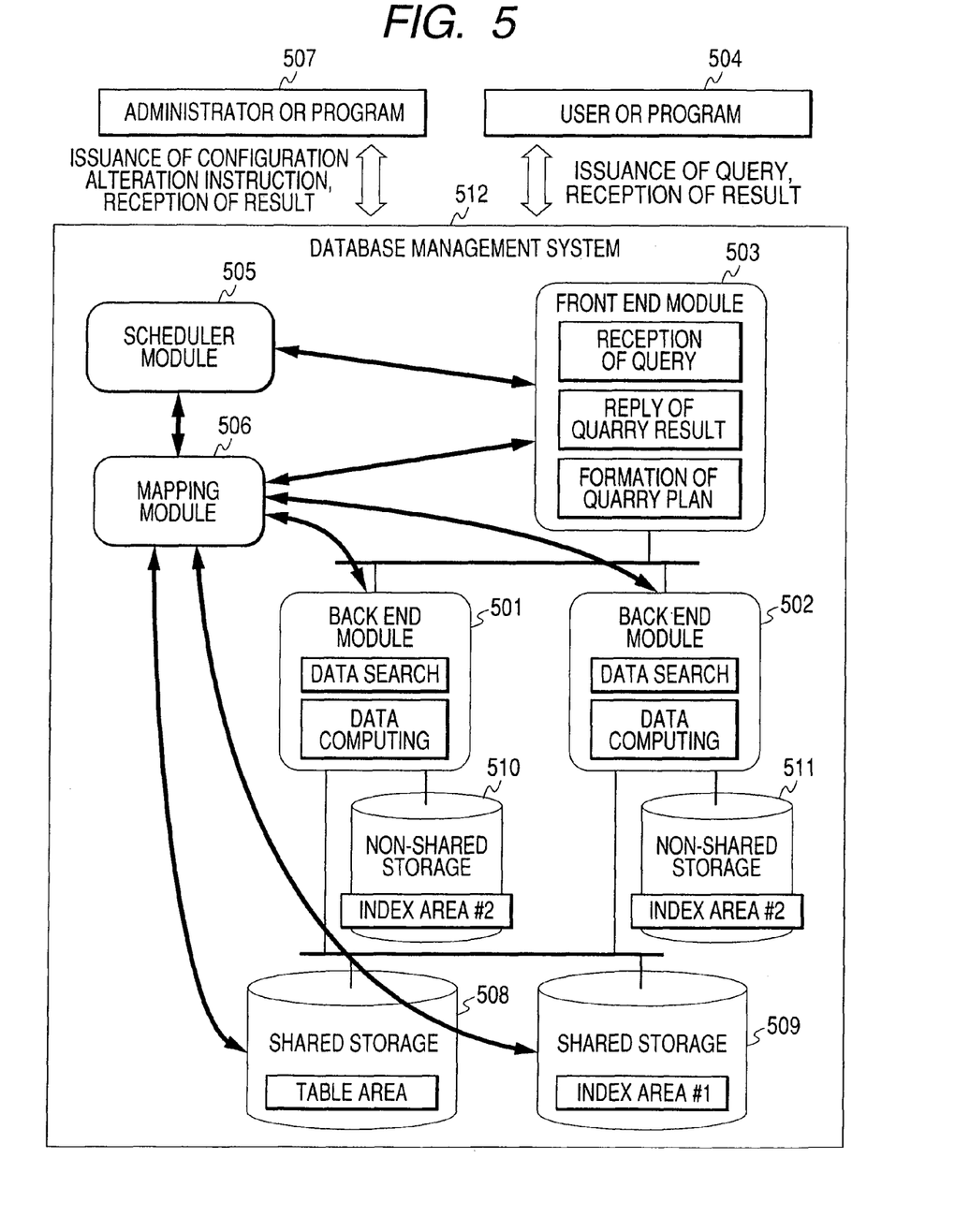
FIG. 5 is an explanatory diagram showing a method for constructing a database management system using a large index and small indices of an embodiment of this invention.

FIG. 5 is a schematic diagram of a first embodiment of this invention. In this embodiment, back end modules 501,502 for performing data search in a table area 508 and the index areas and data operation correspond to the DB servers 101, 102 in FIG. 1, respectively. In addition, a database management system 512 is constructed with: the back end modules 501, 502; a front end module 503 for receiving a query from a user or program 504 and creating a query plan; a scheduler module 505 for managing the configuration alteration done by the function shown in JP 2004-003601 A and a schedule of indexing; a mapping module 506 for managing allocation of the partitioned data areas; the table area 508 in the shared storage; an index area #1 509 in the shared storage; and index areas #2 510, 511 on the non-shared storage; all of which work in conjunction with one another. An administrator or program 507 does input of a configuration altering instruction into the scheduler module 505.

In this embodiment, the function shown in JP 2004-003601 A is applied to the table area 508 and the index area #1 509. The scheduler module 505 is made to perform schedule management of the configuration alteration, and the mapping module 506 is made to perform allocation management of the areas 508,509 on the shared storage. In order to take such a configuration, it is necessary to guarantee that the table area 508 and the index area #1 509 will establish one-to-one correspondence. In this embodiment, the hash-division algorithm was used to partition the table, and the B-Tree index was chosen to be the index. Further, using the technique shown in FIG. 4, the hash function used to partition the table area 508 and the index area #1 509, respectively, are equalized, and the table area 508 and the index area #1 509 are partitioned by the same number of partitions, respectively, whereby consistency is guaranteed. Here, the divided indices being created in the index area #1 509 are referred to as small indices. In the other index areas #2 510,511, the index corresponding to the whole of the table areas allocated to the back end modules 501,502 are created, respectively. In this specification, the index created in each of the index areas #2 510,511 is referred to as a large index.

Figure 6:
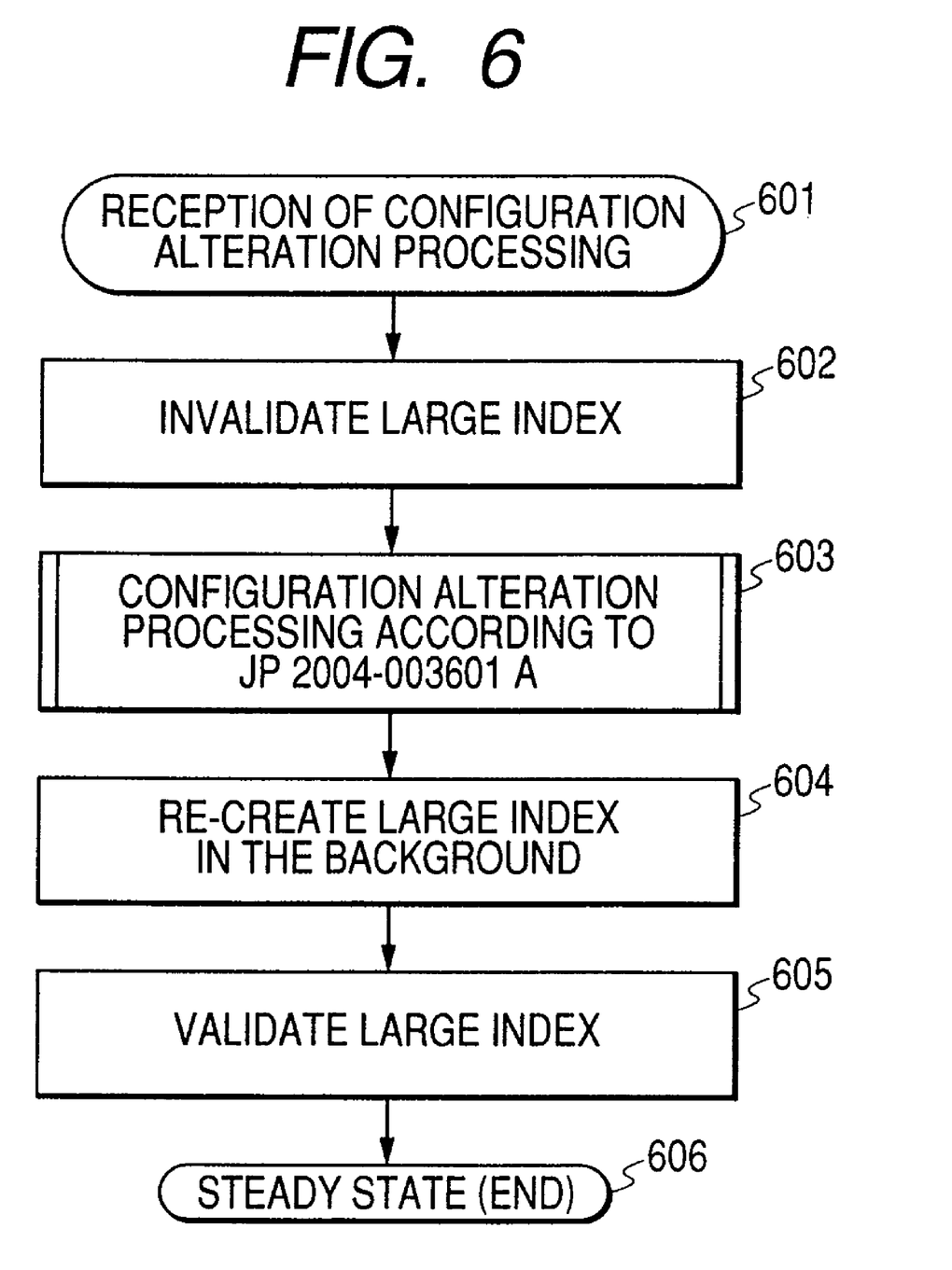
FIG. 6 is an explanatory diagram showing a processing flow of the configuration alteration in the database management system of the above-mentioned embodiment.

Note here that when the configuration is altered, the small areas allocated to the back end modules 501,502 as a table area will change; therefore, discrepancy of contents will arise between the table area 508 and the index areas #2 510, 511. In order to solve the problem, it is necessary to manage the large index before and after the configuration alteration. FIG. 6 shows a processing flow at the time of this configuration alteration. In this flow, after receiving configuration alteration request (Step 601), the large index is invalidated (Step 602) and the configuration alternation is performed (Step 603) according to JP 2004-003601 A. After the configuration alteration (Step 603), the large index that has been invalidated previously (Step 602) is re-created (Step 604). Since the re-creation of the large index (Step 604) is performed in the background, a query from the user or the program 504 is being received continuously. Moreover, during the re-creation of the large index (Step 604), the fall of the retrieval processing speed can be kept to the minimum by performing retrieval processing using the small index. After finishing the re-creation of the large index (Step 604), the large index is validated (Step 605) to be usable in query processing, and the configuration alteration processing is ended (Step 6106).

Note that, in order to re-create the large index by the conventional technique, all the items in a pertinent table need to be scanned. However, in the environment to which this invention is applied, it is guaranteed that the small index corresponding to the large index surely exists and the small index has already been sorted. Therefore, speed-up in re-creating the large index can be attained by creating the large index from the small index, not from the table.

Second Embodiment

Figure 7:
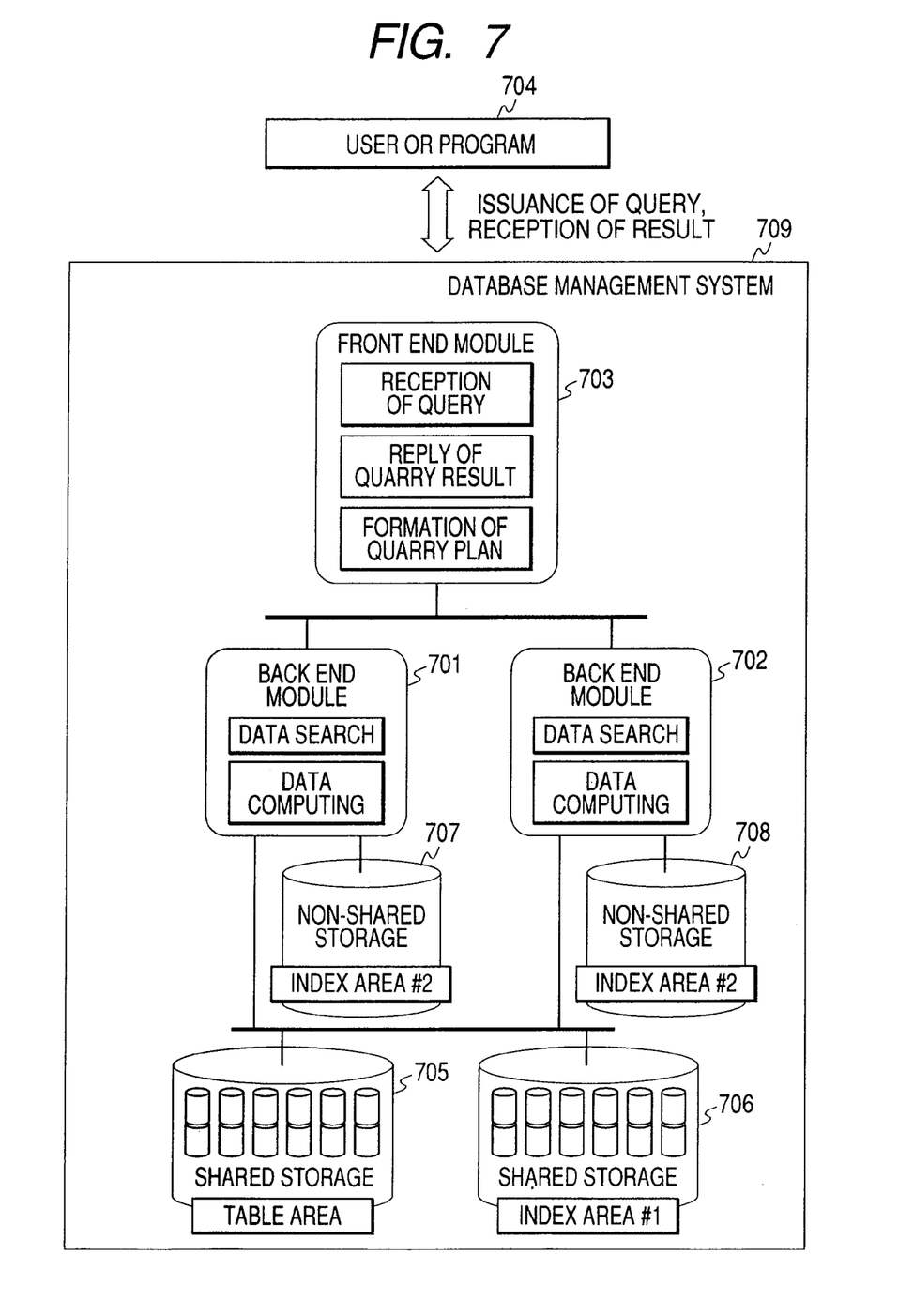
FIG. 7 is an explanatory diagram showing a method for constructing a database management system of another embodiment of this invention.

FIG. 7 is a schematic diagram of one embodiment of this invention. In this embodiment, back end modules 701,702 for performing data search in a table area and an index area and data operation correspond to the DB servers 101,102 of FIG. 1, respectively. In addition, the back end modules 701,702 constitute a database management system 709 along with as a front end module 703 for receiving a query from a program 704 and generating a query plan as well as a table area 705 on a shared storage, an index area #1 706 in the shared storage, and non-shared storage index areas #2 707, 708 all of which work in conjunction with one another.

This embodiment imitates the function shown in JP 2004-003601 A without using the allocation management table. In this embodiment, the table area and the index area #1 in the shared storage are divided into 12 virtual volumes 705, 706, respectively, and allocation of these virtual volumes 705, 706 to the back end servers 701, 702 is managed manually, whereby the functions shown in JP 2004-003601 A are imitated. Storing of the table in the 12-divided virtual volumes 705 is done by taking a method whereby a table divided into to create 12 parts similarly by the hash-division algorithm. Here, a divided index that is created in the index area #1 706 is also referred to as a small index. In the other index areas #2 707,708, an index that corresponds to all the virtual volumes that are allocated to the back end modules 701, 702 is created. The index created in the index areas #2 707, 708 is referred to as a large index.

Figure 8:
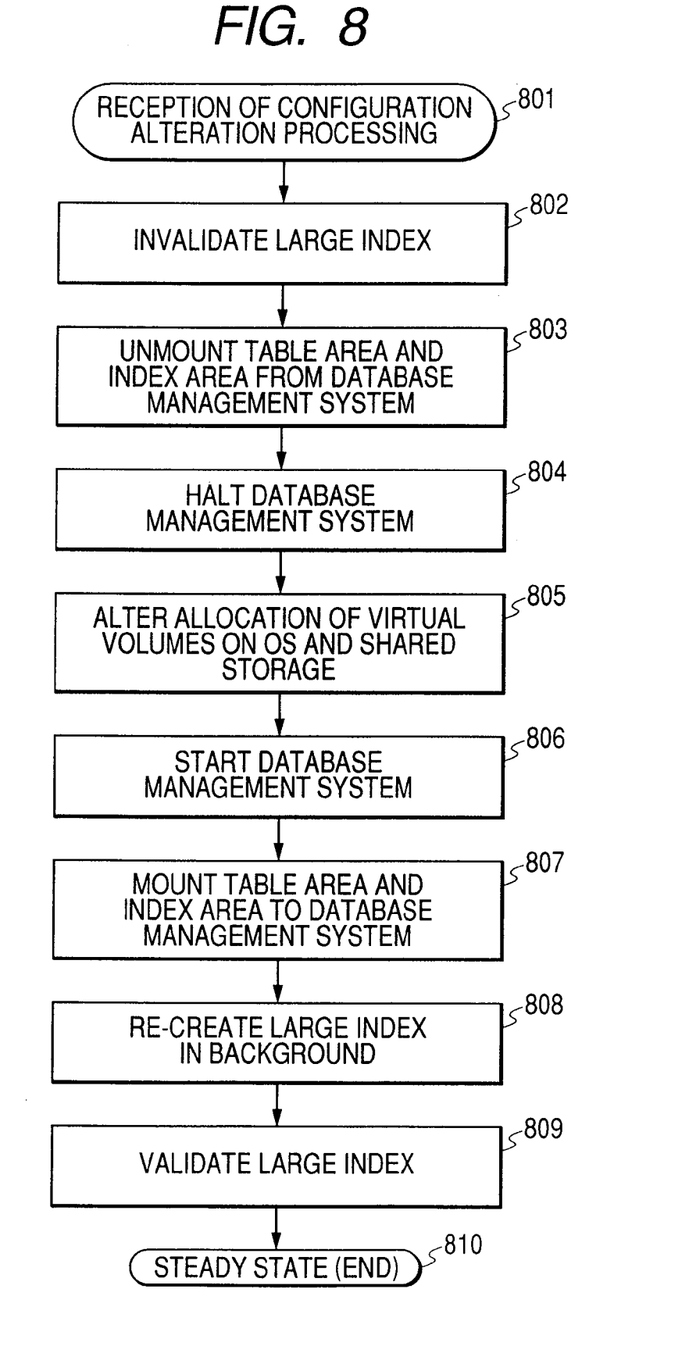
FIG. 8 is a flowchart showing a processing flow of the configuration alteration in the database management system of the above-mentioned embodiment (second embodiment).

In this embodiment, just like the first embodiment, when the configuration is altered, there will occur discrepancy in contents between the table area and the index area #2. FIG. 8 shows a processing flow for management of the large index that is necessary at the time of this configuration alteration. In this embodiment, the large index is invalidated (Step 802) after the reception of the configuration alteration processing (Step 801). In preparation for allocation alteration of the 12-divided virtual volumes 705,706, the table area and the index area #1 are dismounted from a database management system (Step 803), and a database management system is halted (Step 804). Then, instructions are issued to the OS and the shared storage to alter the allocation of the 12-divided virtual volumes 705, 706 (Step 805). Since the database management system has been halted previously (Step 804), this allocation alteration does not cause data loss to be generated. After the allocation alteration (Step 805), the database management system is started (Step 806), and the table area and the index area #1 are re-mounted on the database management system (Step 807). At this time, the database management system becomes able to receive a query from the user or the program 704. Then, the large index that has been invalidated previously (Step 802) is re-created (Step 808). Since the creation of the large index (Step 808) is performed in the background, reception of a query from the user or the program 704 is being done continuously. Moreover, during the re-creation of the large index (Step 808), the fall of retrieval processing speed is kept to the minimum by performing retrieval processing using the small index. After finishing the re-creation (Step 808) of the large index, the large index is validated (Step 809) to be usable in query processing, and the configuration alteration processing is ended (Step 810).

What is claimed is:

1. A database management method in a database management system comprising a plurality of database processing modules executed in a database server which are coupled to a front-end module and access to data composing a database table, a first storage which is shared by said plurality of database processing modules and stores said data composing the database table which is divided into a plurality of partitioned tables each assigned to one of said plurality of database processing modules, a second storage which is shared by each of said plurality of database processing modules and has a first index area storing indexes for said database table, said first index area being divided into a plurality of partitioned index areas each corresponding to respective ones of said partitioned tables and being assigned to one of said plurality of database processing modules to which a corresponding partitioned table is assigned, and a plurality of third storages, each of which is exclusively coupled to one of said database processing modules and have a second index area including indexes for a whole of said partitioned tables which are assigned to the database processing module to which the third storage having the second index area is coupled, said method being executed by the database processing modules, and comprising the steps of:

invalidating indexes of said second index areas;

altering configuration of the database management system whereby each of said plurality of partitioned tables is reassigned to one of said plurality of database processing modules and each of said plurality of partitioned index areas is reassigned to one of said plurality of database processing modules to which the corresponding partitioned table is reassigned;

re-creating indexes of said second index areas;

accessing, by said database processing modules, to said database table by using indexes of said first index area while the indexes of said second index area are being re-created; and validating indexes of said second index areas when re-creation of the indexes of said second index are completed.

2. The database management method according to claim 1, wherein said first storage has a plurality of virtual volumes each storing respective ones of said plurality of partitioned tables.

3. The database management method according to claim 2, further comprising the steps of:

un-mounting, prior to said altering step, said plurality of virtual volumes from the system; and mounting, after said altering step, said plurality of virtual volumes to the system.

4. A database management system comprising:

a front-end module which accepts queries from users and responds to the queries;

a plurality of database processing modules executed in a database server which are coupled to said front-end module and access to data composing a database table;

a first storage which is shared by said plurality of database processing modules and stores said data composing said database table, said database table being divided into a plurality of partitioned tables each assigned to one of said plurality of database processing modules;

a second storage which is shared by said plurality of database processing modules and has a first index area storing indexes for said database table, said first index area being divided into a plurality of partitioned index areas each corresponding to respective ones of said partitioned tables for storing indexes for corresponding partitioned tables and being assigned to one of said plurality of database processing modules to which the corresponding partitioned table is assigned; and a plurality of third storages, each of which is exclusively coupled to one of said database processing modules and has a second index area including indexes for a whole of the partitioned tables which are assigned to the database processing module to which the third storage having the third index area is coupled;

wherein said plurality of database processing modules use indexes stored in said partitioned index areas to access said data of said database table if said second index areas cannot be accessed due to re-creation of indexes of said second index areas following alteration of configuration of the system.

5. The database management system according to claim 4, wherein said database table and said first index area are divided in accordance with the same algorithm.

6. The database management system according to claim 5, wherein said first storage has a plurality of first virtual volumes for storing respective ones of said partitioned tables, and wherein said second storage has a plurality of second virtual volumes for storing respective ones of said first index areas.

7. The database management system according to claim 5, wherein said front-end module accepts queries from users, and generates a query plan executed by said database processing modules.

8. The database management system according to claim 5, further comprising a mapping module which manages assignment of said partitioned tables to said database processing modules and assignment of said partitioned index areas to said database processing modules.

* * * * *